(No Model.)
G. F. BUTTERFIELD.
METHOD OF VULCANIZING RUBBER SOLES TO SHOES.
No. 574,239. Patented Dec. 29, 1896.
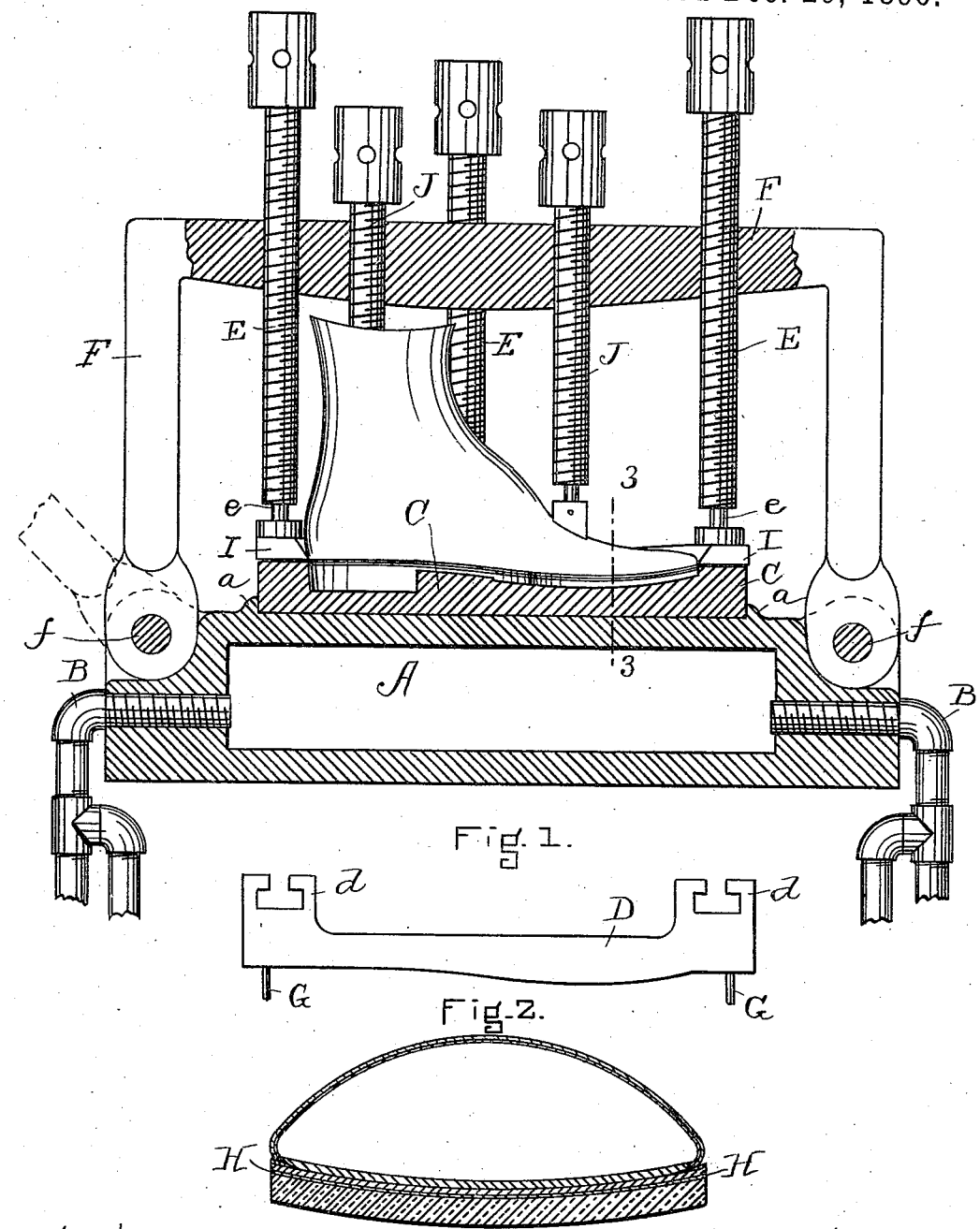
WITNESSES.
Matthew M. Blunt.
Chas Sheeks
INVENTOR.
George F. Butterfield
by A. M. Revved
ATT'Y.

UNITED STATES PATENT OFFICE.

GEORGE F. BUTTERFIELD, OF STONEHAM, MASSACHUSETTS.

METHOD OF VULCANIZING RUBBER SOLES TO SHOES.

SPECIFICATION forming part of Letters Patent No. 574,239, dated December 29, 1896.

Application filed June 1, 1896. Serial No. 593,725. (No specimens.)

*To all whom it may concern:*

Be it known that I, GEORGE F. BUTTERFIELD, of Stoneham, in the county of Middlesex and State of Massachusetts, have invented certain new and useful Improvements in the Method of Vulcanizing Rubber Soles to Shoes, of which the following, taken in connection with the accompanying drawings, is a specification.

This invention is an improved method of securing rubber soles permanently to the leather bottoms of boots and shoes.

My novel method contemplates the formation of a sole or sole and heel of any suitable shape of vulcanized rubber or any desired compound thereof and of any proper degree of hardness, then coating the upper surface of such sole with rubber-cement and applying thereon a sheet of unvulcanized-rubber compound, then coating the leather bottom of the lasted shoe with rubber-cement and placing it over and holding it firmly upon said unvulcanized sheet, and finally vulcanizing such sheet and thereby firmly uniting said shoe and sole. Ground cork or mineral-wool may be compounded with the rubber, or the material in the interior of the sole and heel may be of the form known as "sponge-rubber," having numerous small air-cavities in it, thus forming a sort of pneumatic sole.

The means illustrated for curing the interposed unvulcanized sheet include a closed steam-chamber upon which is placed the independent and removable mold-plate containing, in a recess in its upper surface, the vulcanized sole covered with the unvulcanized sheet, in combination with a frame and screws for holding the shoe and its last and the mold-plate itself in position while said sheet is being sufficiently cured by the heat conducted to it. Such frame and screws are shown connected to the steam-chamber to resist the expansion of the rubber, but the steam-pressure is controlled by the walls of the chamber.

In the drawings, Figure 1 is an elevation, partly in vertical section, showing my apparatus with a shoe held upon the mold-plate to secure its rubber sole in place. Fig. 2 is an edge view of the mold-cap; and Fig. 3 an enlarged transverse section through the shoe at the dotted line 3, Fig. 1.

A represents the closed steam-chamber, having inlet and outlet pipes B.

C is the mold-plate, resting on the top of the chamber A between guides-ribs $a$. This mold-plate has in its upper surface a sole-and-heel-shaped recess in which the rubber sole and heel are first formed and vulcanized, the cap D (shown in Fig. 2) closing the top of the mold and being held down by the screws E E, which engage screw-threads in the frame F. Guide-pins G serve to locate the cap properly with relation to the mold-plate, and fingers $d$ on the cap engage by a sidewise movement with the terminal necks $e$ on the screws to raise the cap when desired. Marginal plates I fit snugly around the sides of the shoe along the inseam. The frame F is held at each end to the chamber A by a stout rod $f$, one of which rods forms a pivot when the other is withdrawn. Thus the frame and its screws may be turned up when desired.

The steam in chamber A is at a high temperature and heats, by conduction, the mold-plate C, so as to effectually cure the rubber in the mold. A series of these soles may be prepared in readiness for application to shoes, or, if preferred, each sole may be applied before its removal from the mold.

When the sole and shoe are to be united, the vulcanized sole in the mold is coated on its upper surface with rubber-cement, and the leather bottom of the shoe is similarly coated. Then a sheet of unvulcanized rubber H, of good quality, is applied over the top of the vulcanized sole and heel and the shoe-bottom fitted carefully and pressed firmly thereon. The edges of the welt or of the sole, or both, project outwardly all around and are caught between the mold-plate C and the marginal plates I, being pressed very firmly by the screws E E, so that the rubber is prevented from escaping around the margins of the mold. The screws J press down upon the lasted shoe and upon the head of the last, so as to hold the shoe most firmly. Steam is then admitted to the chamber A, and the mold-plate C and rubber therein are heated thereby, the heat being maintained until the relatively thin sheet of rubber H is sufficiently cured.

In vulcanizing rubber onto leather it is important to have the heat applied only on one side and directly to the rubber. In this way the leather is not injured and the rubber is most firmly united to the leather. Suitable apparatus for this work is also set forth in my application for patent thereon filed February 18, 1896, Serial No. 579,724.

I claim as my invention—

The described method of uniting vulcanized-rubber soles to the leather bottoms of boots and shoes, consisting in forming such sole in a mold and suitably vulcanizing it therein; then coating the upper surface of such sole with rubber-cement and applying thereon a sheet of unvulcanized-rubber compound; then coating the shoe-bottom with rubber-cement and holding the shoe pressed firmly upon said unvulcanized sheet, and finally vulcanizing such sheet while the shoe is so held, thereby firmly uniting said sole to the shoe, substantially as set forth.

In testimony whereof I have signed my name to this specification, in the presence of two subscribing witnesses, on this 28th day of May, A. D. 1896.

GEORGE F. BUTTERFIELD.

Witnesses:
  A. H. SPENCER,
  N. K. BAKER.